United States Patent [19]
Huang

[11] Patent Number: 5,713,228
[45] Date of Patent: Feb. 3, 1998

[54] AUTOMOBILE STEERING LOCK

[76] Inventor: E-Tao Huang, No. 68, lane 27, Section 6, Fu-An Road, Tainan, Taiwan

[21] Appl. No.: 217,544

[22] Filed: Mar. 25, 1994

[51] Int. Cl.$^6$ .................................................. B60R 25/02
[52] U.S. Cl. ............................ 70/209; 70/226; 70/237
[58] Field of Search .......................... 70/209–212, 225, 70/226, 237, 238

[56] References Cited

U.S. PATENT DOCUMENTS

| | | | |
|---|---|---|---|
| 5,069,048 | 12/1991 | Lo | 70/209 |
| 5,092,146 | 3/1992 | Wang | 70/226 X |
| 5,097,685 | 3/1992 | Lien | 70/226 X |
| 5,107,691 | 4/1992 | Wu | 70/209 |
| 5,107,692 | 4/1992 | Chen | 70/209 |
| 5,174,138 | 12/1992 | Shen | 70/209 |
| 5,179,849 | 1/1993 | Wang | 70/209 |
| 5,212,973 | 5/1993 | Van Staden et al. | 70/209 |
| 5,255,544 | 10/1993 | Wu | 70/209 |
| 5,257,518 | 11/1993 | Hsieh | 70/209 |

FOREIGN PATENT DOCUMENTS

| | | | |
|---|---|---|---|
| 2468488 | 5/1981 | France | 70/209 |
| 2924103 | 7/1980 | Germany | 70/238 |

*Primary Examiner*—Suzanne Dino
*Attorney, Agent, or Firm*—Bacon & Thomas

[57] ABSTRACT

An antitheft device for attachment of a steering wheel of an automobile comprising an elongate main body having a passageway in an end portion for an elongate rod member to telescope therein and a hook formed in an intermediate portion, a lock housing fixed to extend on an end portion of the main body, and a lock fixed in the housing and having a pusher with a key hole and a dead bolt to move with the pusher, an elongate rod member having a plurality of annular grooves with vertical side surfaces and a U-shaped hook at an outer end, the two hooks hooking on two portions of a steering wheel of an automobile, the pusher of the lock being pressed to move the dead bolt down to engage one of the grooves in the rod member to lock it immovable, the dead bolt being moved up by a key rotating the pusher for 90 degrees in case of unlocking this lock.

1 Claim, 7 Drawing Sheets

AUTOMOBILE STEERING LOCK

BACKGROUND OF THE INVENTION

A conventional automobile steering lock shown in FIGS. 1-3 comprises a main body A, a spring B, a locating means C, a cap D, a lock E, an elongate body member F, an elongate rod member G combined together.

The locating means C has a vertical surface C1 and a sloped surface C2 in a lower end. The elongate rod member has a plurality of annular grooves G1, which respectively have a sloped surface G10 and a vertical surface G11 so that the rod member G may be pulled to move outward with the sloped surfaces G10 of the grooves G1 sliding on the sloped surface of the locating means C when the locating means C is pressed down, but the rod member G cannot be pulled to move inward with the vertical surfaces G11 stopped by the vertical surface C1 of the locating means C, locking the rod member immovable to attach this lock on a steering wheel of an automobile.

The above mentioned conventional steering lock has the following drawbacks.

1. The hook of the body member cannot closely be attached on the steering wheel, making the right end of the body member A form an angle against the steering wheel occupying a large space, and liable to collide with a rider coming in the car.

2. If the rod member G is pulled outward with too strong a force, the vertical surface C1 of the locating means C may be broken, making it impossible to stop the vertical surface G11 of rod member G, and if worse, the rod member G will get out of the body member.

SUMMARY OF THE INVENTION

A main purpose of this invention is to offer an automobile steering lock possible to be attached on a steering wheel of an automobile very flatly on it, with little possibility of collision with a rider coming in the car.

Another purpose is to provide a locating means not easily broken by the rod member, and possible to stop the rod member stably.

A main feature of the present invention is one of two hooks provided in an intermediate portion of a body member, with a stop short rod and an opening for a portion of a steering wheel to pass through.

Another feature is a rod member provided with a plurality of annular grooves with vertical surfaces to engage vertical side surfaces of a round dead bolt of a lock for completely stopping the rod member immovable.

DETAILED DESCRIPTION OF THE INVENTION

Figure 1:
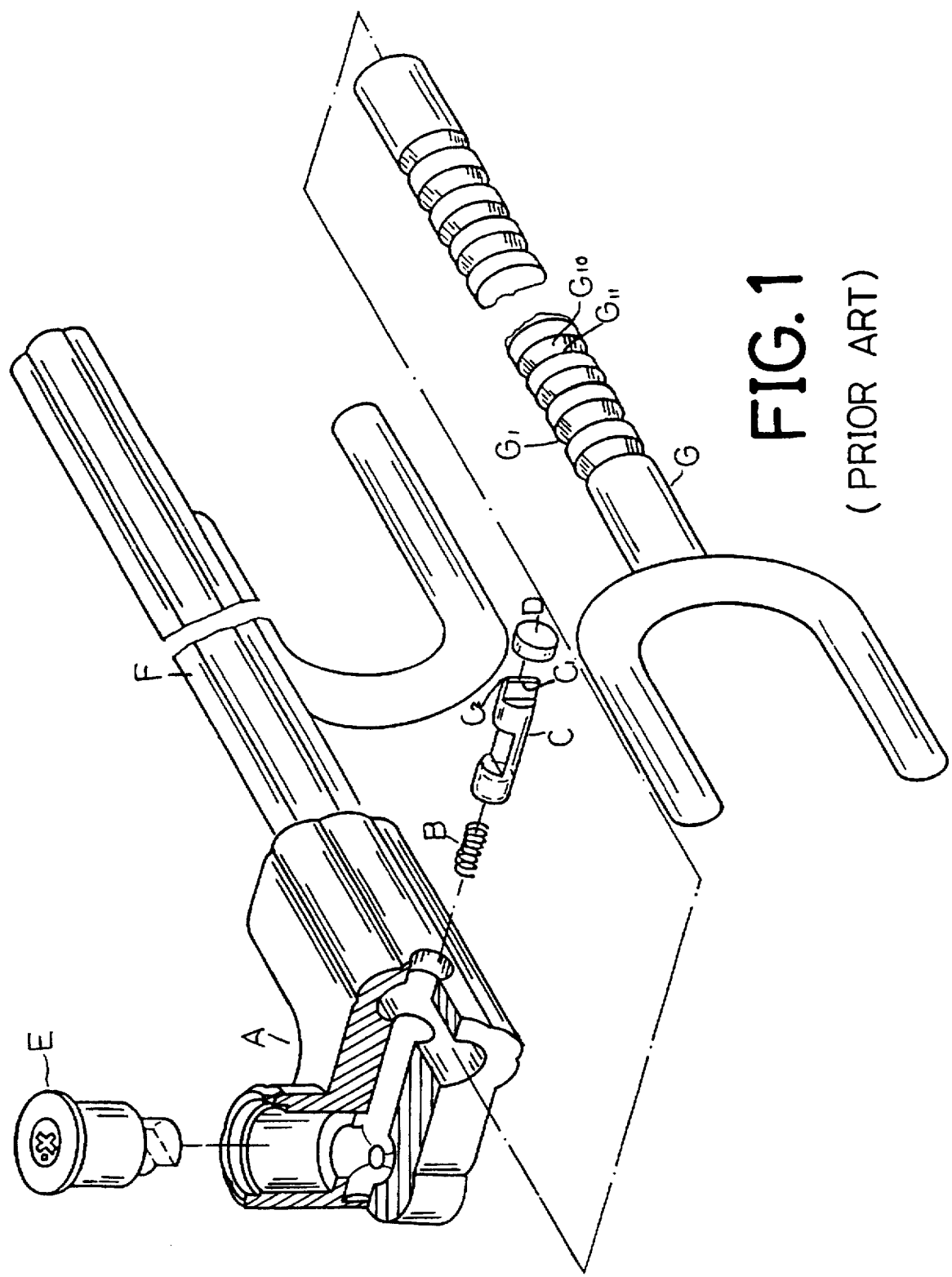
FIG. 1 is an exploded perspective view of a conventional automobile steering lock.
Figure 2:
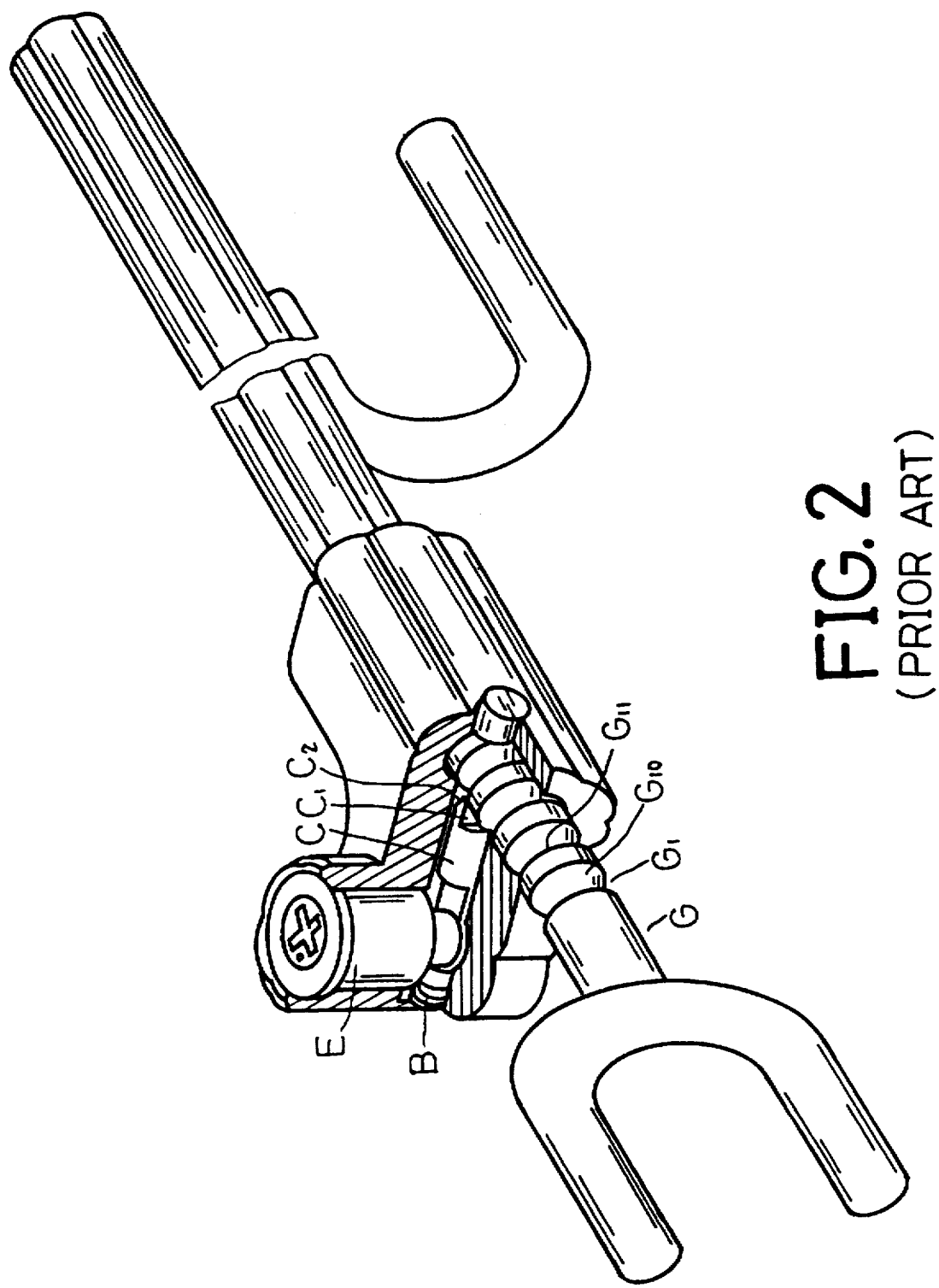
FIG. 2 is a perspective view of the conventional automobile steering lock.
Figure 3:
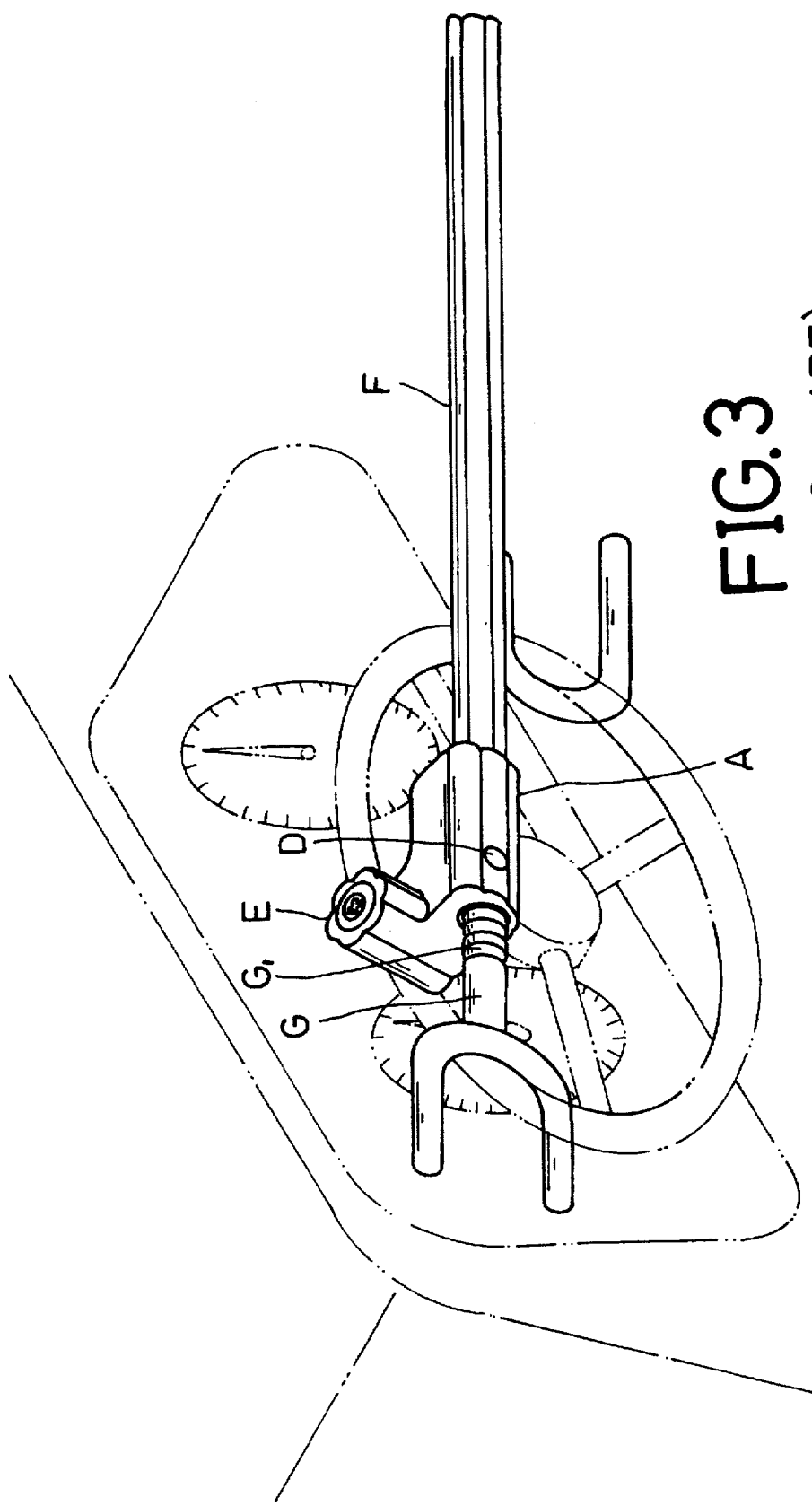
FIG. 3 is a perspective view of the conventional automobile lock being locked on a steering wheel.
Figure 4:
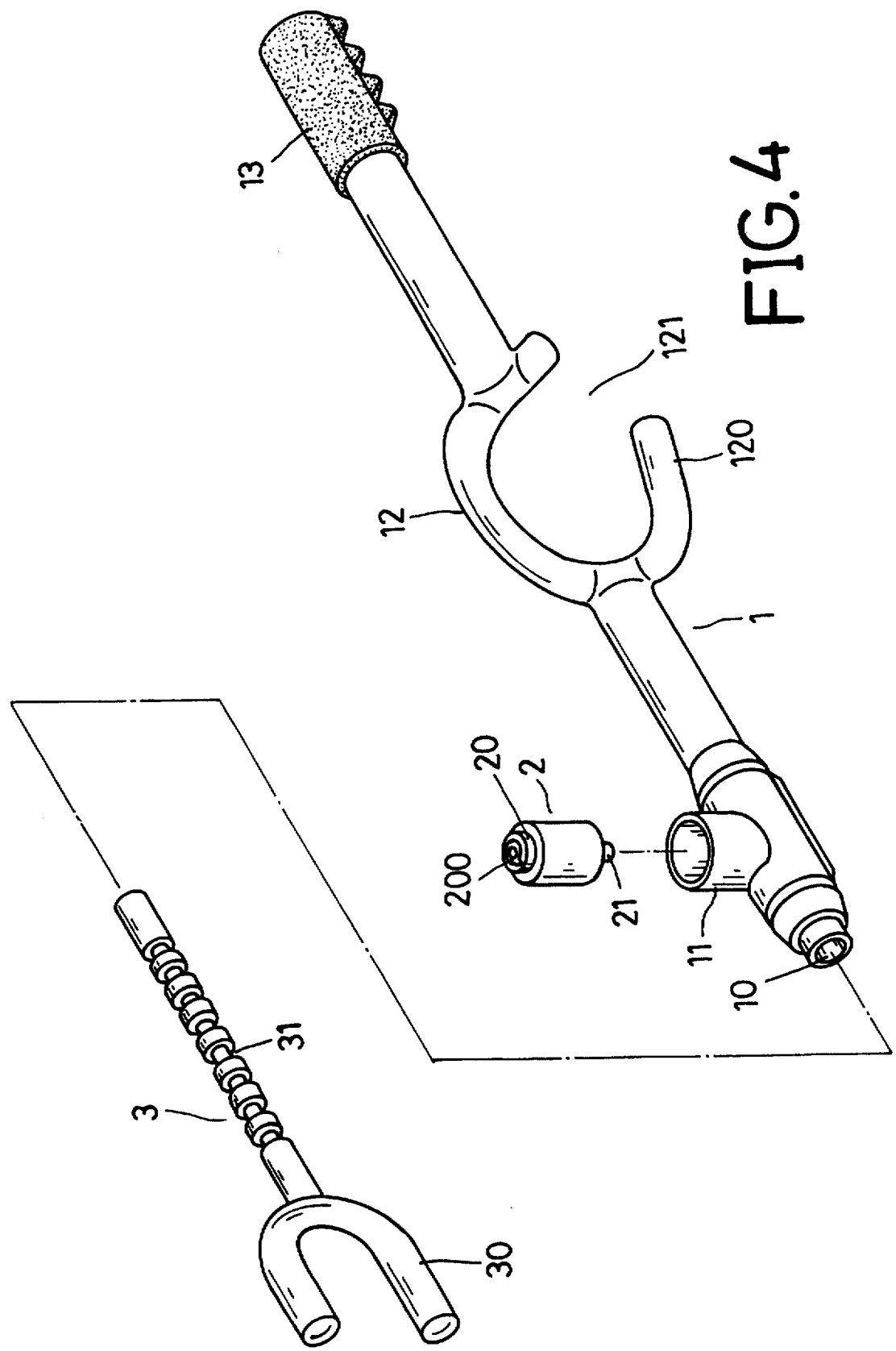
FIG. 4 is an exploded perspective view of an automobile steering lock in the present invention.
Figure 5:
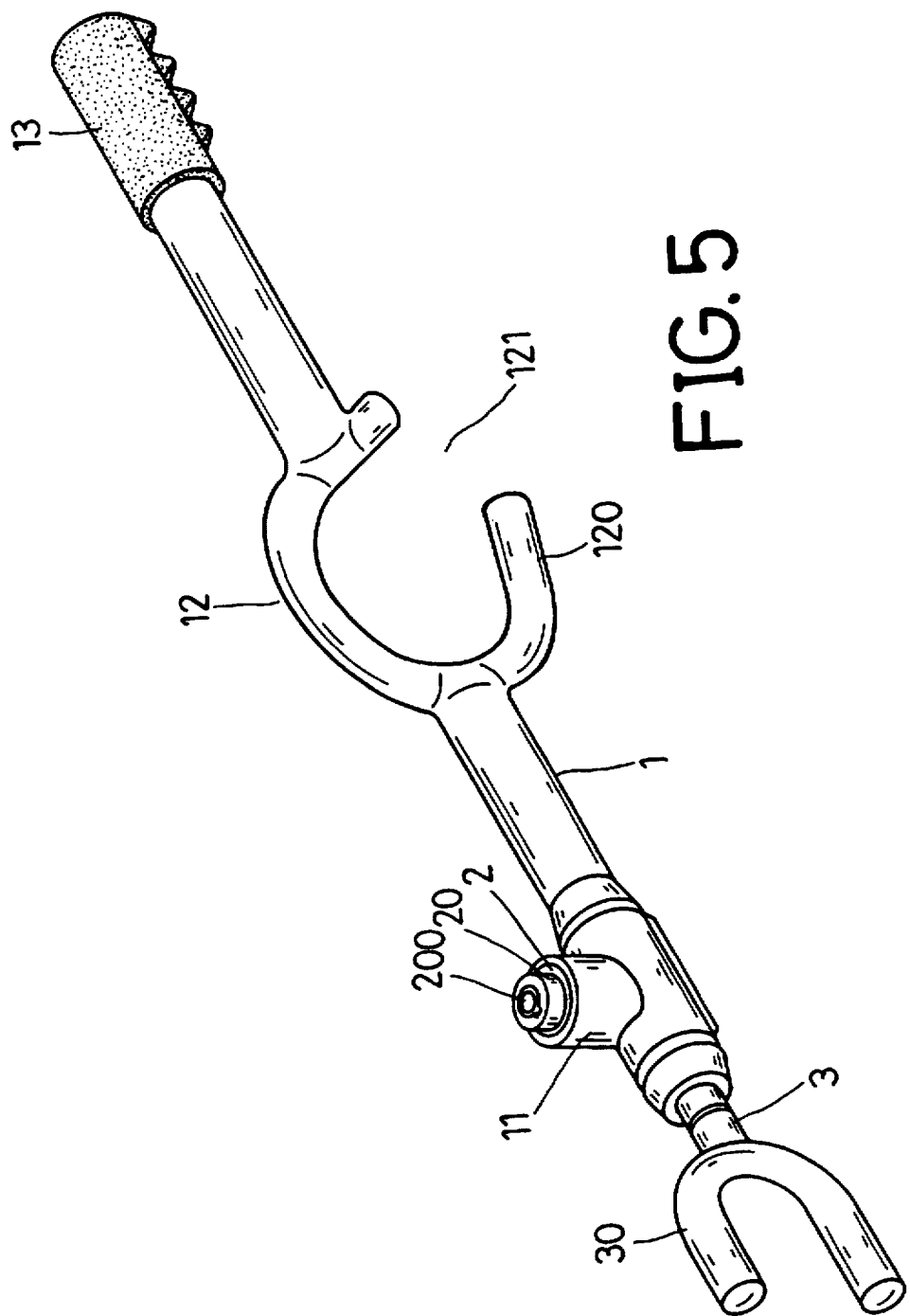
FIG. 5 is a perspective view of the automobile lock in the present invention.

An automobile steering lock in the present invention, as shown in FIG. 4 and 5, comprises an elongate body member 1 having a passageway 10 in an inner end portion, a lock housing 11 provided to extend upright from the inner end portion and having its empty interior communicating with the passageway 10, a fishhook-shaped hook 12 in an intermediate portion, a stop short bar 120 extending down from a lower end of the hook 12, an opening 121 formed between an outer end of the fishhook-shaped hook 12 and an outer end of the stop short bar 120 for a portion of a steering wheel to pass through, a grip 13 fixed on an outer end of the body member 1.

A lock 2 is provided to be deposited in the lock housing 11, having a cylindrical pusher 20 extending out of an upper end, a key hole 200 provided in the pusher 20 for a key to fit therein for unlocking the lock, a round dead bolt 21 moving with the pusher 20 extending down from a lower end.

An elongate rod member 3 is provided to telescope in the passageway 10 of the body member 1, having a plurality of annular grooves 31 in a substantial portion of the rod member 3 and a U-shaped hook 30 fixed at an outer end to fit around a portion of a steering wheel of an automobile.

Figure 6:
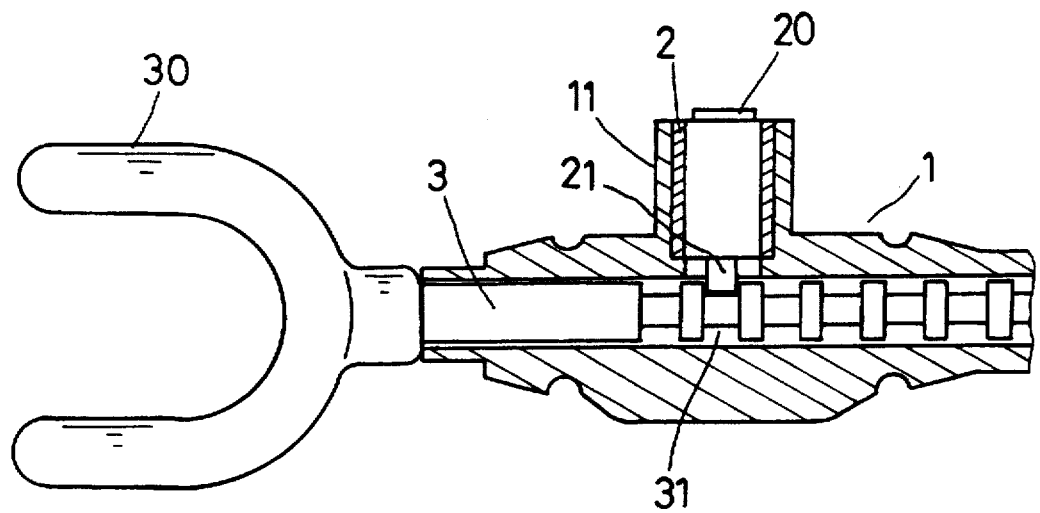
FIG. 6 is a cross-sectional view of the automobile lock locked position in the present invention.

In assembling, as shown in FIGS. 5 and 6, first, the lock 2 is deposited in the lock housing 11, and then the elongate rod member 3 is pushed with its inner end sliding in the passageway 10 of the body member 1, and after that the pusher 20 of the lock 2 is pressed down, forcing the dead bolt 21 of the lock 2 to extend down to engage one of the grooves 31. Then the rod member 3 is stably combined with the main body 1, finishing assembly of this steering lock.

Figure 7:
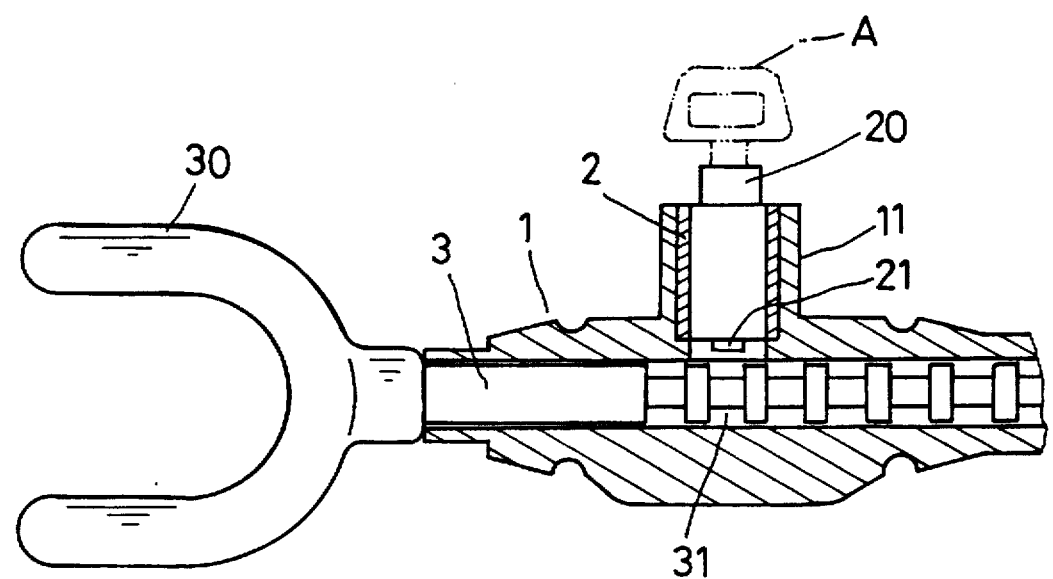
FIG. 7 is a cross-sectional view of the automobile lock in unlocked position in the present invention.
Figure 8:
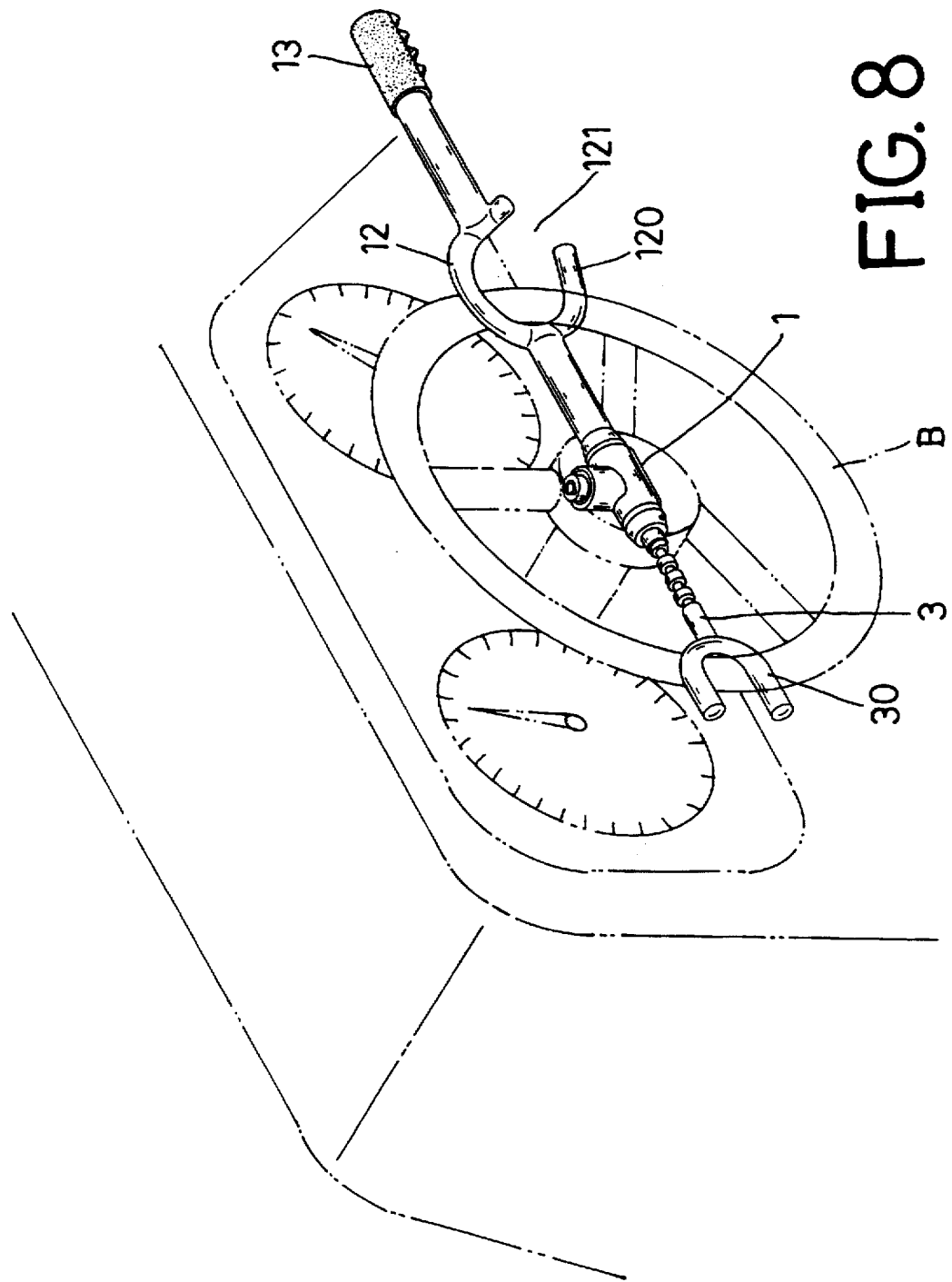
FIG. 8 is a perspective view of the automobile lock being locked on a steering wheel in the present invention.

If the steering lock is to be attached and locked on a steering wheel, as shown in FIGS. 7 and 8, a key A is to be inserted in the key hole 200 of the pusher 20 and rotated for 90 degrees forcing the dead bolt 21 to be raised up to disengage from the groove 31 and permitting the rod member 3 to no longer be stopped by the dead bolt 21. Then the rod member 3 can be pulled outward in the passageway 10. The grip 13 is to be held with hand firmly, managing the opening 121 of the hook 12 to be passed through by a portion of a steering wheel B from inside to hook the hook 12 with the wheel B, and the rod member 3 is pulled outward to let the hook 30 hook a portion of a steering wheel B from inside. Then the pusher 20 of the lock 2 is pressed down, forcing the dead bolt 21 move down to engage one of the grooves 31, locking the steering wheel B very quickly.

Provided the steering lock is to be released and taken away from the steering wheel B, the key A is inserted in the key hole 200 of the pusher 20 and rotated for 90 degrees, forcing the dead bolt 21 to be raised up to disengage from the groove 31 and freeing the elongate rod member 3 so that the rod member 3 can be pushed more inward in the body member 1, unhooking the hook 30 from the steering wheel B and then unhooking the hook 12 from the steering wheel B and letting the opening 121 pass through the steering wheel B. Now the steering lock is completely taken away from the steering wheel B.

As can be understood from the above description, this steering lock has the following advantages.

1. The fishhook-shaped hook 12 is directly provided in the intermediate portion of the body member 1, so the rear portion of the body member 1 may align with a steering wheel B after the steering lock is attached on the steering wheel B for locking, not bending for a certain angle and occupying less space in a car without possibility of a rider in the right side to collide with the body member 1 to be injured.

2. The grooves 31 each have vertical surfaces to engage stably with the two vertical surfaces of the dead bolt 21 so that exterior shocks cannot break the dead bolt 21, keeping the rod member 3 stably immovable in the body member 1 when locked, without possibility of losing locking function of this steering lock.

What is claimed is:

1. An antitheft device for attachment to a vehicle steering wheel comprising;

an elongated body member having an inner end portion and an outer end portion extending along a common control axis, and provided with: a passageway in the inner portion; a lock housing fixed upright on the inner end portion and having an interior chamber communicating with said passageway; a first generally "U"-shaped hook having opposite leg portions, the leg portions having ends forming an opening therebetween for hooking a portion of a steering wheel whereby the inner end portion is attached to one leg portion and the outer end portion is attached to the opposite leg portion such that the opening extends obliquely to the elongated body member;

a lock fixed in said lock housing and having a round solid pusher to extend out of an upper end of the lock, a key hole formed in said pusher to rotate it 90 degrees for locking and unlocking, and a rod-shaped dead bolt extending down from a bottom end of the lock connected to and moving with the pusher;

an elongate rod member provided to telescope in said passageway, having; a second U-shaped hook on an outer end for hooking a portion of a steering wheel; and a plurality of annular grooves formed in a substantial portion of the rod member, each of said annular grooves having opposite vertical side surfaces spaced apart from one another to enable said dead bolt to engage therein to hold said rod member immovable when said pusher of the lock is pressed down;

said body member being on the same surface of a steering wheel, not bending upward when the anti-theft device is attached to the steering wheel, preventing a rider from colliding with the elongated body member when entering the vehicle.

* * * * *